US008803992B2

(12) United States Patent
Shingu et al.

(10) Patent No.: US 8,803,992 B2
(45) Date of Patent: Aug. 12, 2014

(54) AUGMENTED REALITY NAVIGATION FOR REPEAT PHOTOGRAPHY AND DIFFERENCE EXTRACTION

(75) Inventors: Jun Shingu, Kanagawa (JP); Donald Kimber, Foster City, CA (US); Eleanor Rieffel, Mountain View, CA (US); James Vaughan, Sunnyvale, CA (US); Kathleen Tuite, Seattle, WA (US)

(73) Assignee: Fuji Xerox Co., Ltd., Tokyo (JP)

( * ) Notice: Subject to any disclaimer, the term of this patent is extended or adjusted under 35 U.S.C. 154(b) by 295 days.

(21) Appl. No.: 12/779,021

(22) Filed: May 12, 2010

(65) Prior Publication Data

US 2011/0279697 A1 Nov. 17, 2011

(51) Int. Cl.
*H04N 5/228* (2006.01)

(52) U.S. Cl.
USPC ...................................... 348/222.1; 328/222

(58) Field of Classification Search
CPC .......... H04N 2201/3253; H04N 9/045; H04N 5/2621; G06T 19/006
USPC ...................................... 382/222; 348/222.1
See application file for complete search history.

(56) References Cited

U.S. PATENT DOCUMENTS

| 5,898,438 A | 4/1999 | Stewart et al. |
| 2001/0008846 A1* | 7/2001 | Yamauchi et al. ............... 463/31 |
| 2004/0136568 A1* | 7/2004 | Milgram et al. .............. 382/104 |
| 2004/0160336 A1* | 8/2004 | Hoch et al. ............... 340/825.22 |
| 2004/0189829 A1* | 9/2004 | Fukuda et al. ................. 348/239 |
| 2007/0085706 A1* | 4/2007 | Feyereisen et al. ........... 340/968 |
| 2007/0266312 A1* | 11/2007 | Ayaki et al. .................... 715/526 |
| 2008/0112610 A1* | 5/2008 | Israelsen et al. .............. 382/154 |

OTHER PUBLICATIONS

USGS Repeat Photography Project, http://nrmsc.usgs.gov/repeatphoto/, retrieved on Sep. 28, 2009.
Vertigo, http://www.basichip.com/vertigo/main.htm, retrieved on Sep. 28, 2009.
Viewfinder, http://interactive.usc.edu/viewfinder/, retrieved on Sep. 28, 2009.
P. Chippendale et al., "Environmental Content Creation and Visualisation in the 'Future Internet'", Future Internet—FIS 2008: First Future Internet Symposium, FIS 2008, Vienna, Austria, Revised Selected Papers, pp. 82-93, Sep. 29-30, 2008.
H. Wuest et al., "Tracking of industrial objects by using CAD models", Journal of Virtual Reality and Broadcasting, vol. 4, No. 1, 2007.
ARToolKit, http://www.hitl.washington.edu/artoolkit/, retrieved on Sep. 23, 2009.

(Continued)

*Primary Examiner* — Usman Khan
(74) *Attorney, Agent, or Firm* — Sughrue Mion, PLLC

(57) ABSTRACT

Systems and methods for repeat photography and difference extraction that help users take pictures from the same position and camera angle as earlier photos. The system automatically extracts differences between the photos. Camera poses are estimated and then indicators are rendered to show the desired camera angle, which guide the user to the same camera angle for repeat photography. Using 3D rendering techniques, photos are virtually projected onto a 3D model to adjust them and improve the match between the photos, and the difference between the two photos are detected and highlighted. Highlighting the detected differences helps users to notice the differences.

22 Claims, 20 Drawing Sheets

(56) References Cited

OTHER PUBLICATIONS

P. Georgel et al., "An Industrial Augmented Reality Solution for Discrepancy Check", Proceedings of the 2007 6th IEEE and ACM International Symposium on Mixed and Augmented Reality, pp. 1-4, 2007.

S. Nolle et al., "Augmented reality as a comparison tool in automotive industry", Proceedings of the 2006 Fifth IEEE and ACM International Symposium on Mixed and Augmented Reality (ISMAR'06)—vol. 00, pp. 249-250, 2006.

A. Tang et al., "Comparative effectiveness of augmented reality in object assembly", Proceedings of the Sigchi conference on Human factors in computing systems, pp. 73-80, Apr. 5-10, 2003.

P. Debevec et al., "Efficient View-Dependent Image-Based Rendering with Projective Texture-Mapping", EGRW '98, 1998.

P.J. Narayanan et al., "Depth+Texture Representation for Image Based Rendering", ICVGIP 2004, 2004.

M. Zhang et al., "OCRdroid: A Framework to Digitize Text Using Mobile Phones", MOBICASE 2009, 2009.

* cited by examiner

Taken photo

Corresponding 3D view

AUGMENTED REALITY NAVIGATION FOR REPEAT PHOTOGRAPHY AND DIFFERENCE EXTRACTION

BACKGROUND OF THE INVENTION

1. Field of the Invention

This invention relates in general to methods and systems involving cameras and, more particularly, to providing navigational aid and difference extraction.

2. Description of the Related Art

To observe changes of an object or scene, repeat photos are sometimes taken. The most famous examples in the field of "repeat photography" or "rephotography" are applications to historic buildings or nature that show changes over time. For example, rephotographers take pictures of mountains or buildings from the same camera angle and position as photos that had been taken years ago, as can be seen in the USGS Repeat Photography Project and VERTIGO. In the manufacturing area, repeat photography for examination is also practiced. For example, in order to compare two industrial parts where one part has a problem and another part works well, pictures are taken of both parts to compare the difference. However, it is not easy to take pictures of an object twice from the same camera angle when using a handheld camera.

To take photos from the same camera angle, geometrical relationships between the object and the camera have to be estimated. There are many methods to estimate a camera pose, and to match photos of an object with its 3D model. The Viewfinder and Marmota projects match scene photos to corresponding 3D models in Google Earth ("Environmental Content Creation and Visualisation in the 'Future Internet'", John Domingue and Dieter Fensel and Paolo Traverso, FIS2008, 2008). Camera poses can also be estimated from an object using its 3D CAD model ("Tracking of Industrial Objects by using CAD models" Harald Wuest and Didier Stricker, Journal of Virtual Reality and Broadcasting, Vol. 4, No. 1, 2007).

There is a need for systems and methods that can guide the user in real time to the same camera position and angle from which a previous shot was taken.

SUMMARY OF THE INVENTION

In one aspect of the present invention, a system including a camera receiving live feed, and a database of pictures is involved. The system may also include, a determining unit determining, the camera pose, which may contain at least one angle and a position, the object to be captured, a 3D model of the object, placed in a known position, a picture, which we will refer to as the original picture, of the object from a data base of pictures, and a region of interest in the picture. The pose, the camera angles and position, from which the original picture was taken, with respect to the object, is known or is determined from the picture by, for example, identifying markers of known position in the original picture and using this information to deduce the pose. A guiding unit provides a first indication, overlaid on the live feed, of the pose associated with the original picture. A third indication is also provided if the angles and position associated with the live feed is within a specified tolerance to the angle and position of the object to be captured.

Aspects of the present invention further include methods for navigating a camera receiving live feed to take a snapshot at an angle and position similar to a previous snapshot. Such methods may include using a virtual 3D model of an object within the previous snapshot, determining the angle and position of the previous snapshot by identifying visual features, such as Augmented Reality (AR) type markers, in the picture, using the known spatial relation between the visual features and the object, and matching the previous snapshot with the virtual 3D model of the object using the geometry of model of the object determining an angle and position of the live feed with respect to the virtual 3D model; and overlaying indications onto the live feed of the camera based on the angles and position of the previous snapshot relative to the angles and position of the live feed.

Aspects of the present invention further include methods for navigating a camera receiving live feed to take a snapshot at an angle and position similar to a previous snapshot, the methods involving receiving a three dimensional model as input, interpolating the angle and the position of the previous snapshot based on the three dimensional model, determining an angle and position of the live feed, and overlaying indications onto the live feed of the camera based on the interpolated angle and position of the previous snapshot relative to the angle and position of the live feed.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive technique. Specifically.

DETAILED DESCRIPTION

Figure 1:
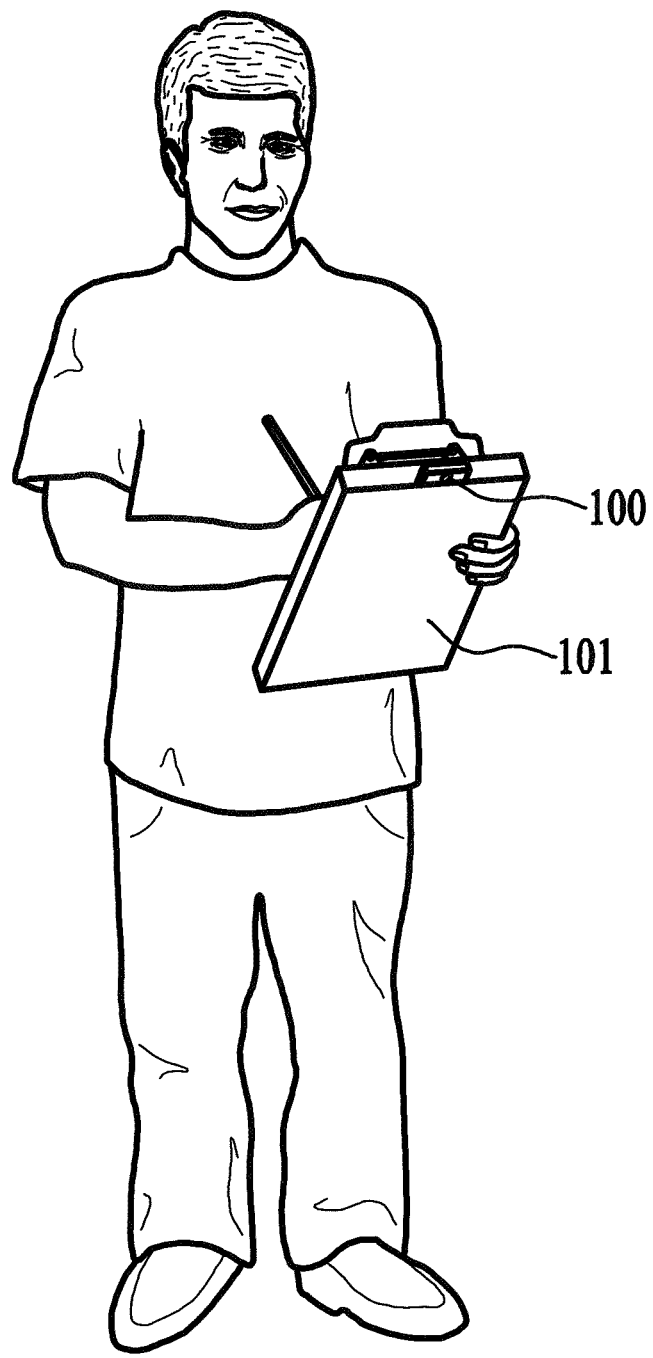
FIG. 1 illustrates an embodiment of the present invention with a camera with an attached display.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Various embodiments of the present invention utilize a variation of an Augmented Reality (AR) system to help users to take pictures in the same position and camera angles as before. The system also automatically extracts differences between the photos. It uses existing methods to estimate the camera poses. In some cases, a 3D model of a target object is used, such as a CAD model, in a known position. Given the camera pose, one or more graphics are rendered on the camera's screen that indicates the camera angle of the original picture. The rendered graphics guide the user to the same camera angle for repeat photography.

Although the AR navigation helps the user to bring the camera to the correct angle, the pose of a second photo will not necessarily be identical to the first one. Using 3D rendering techniques, the system can virtually project those photos onto the 3D model to adjust them, and the difference of two photos is thereby detected and highlighted. Highlighting the detected differences helps users to notice the differences. Differences can be re-projected onto the 3D model, so that the user can examine the differences in the context of the 3D model.

Discrepancy checking is a task that compares an object and its 3D CAD model to make sure the object is manufactured correctly. Some applications can overlay a 3D CAD model on the corresponding photo. These applications are useful to compare shapes between a 3D CAD model and an object. The focus here is on detecting the difference in object appearance, which can be observed only from photos, such as scratches and stains on the surface.

Once the second photo is taken, the two photos are projected onto the 3D model from their camera position to enable slight adjustments needed to compensate for differences in camera pose. Projecting a photo onto a 3D model is a conventional technique in 3D graphics for putting photo realistic texture, however, it has never been used for compensating for differences in camera poses. Image based rendering can generate new views from two or more images. Image based rendering can be applied to adjust the camera pose, but it needs to find image correspondence points to generate a depth map, which sometimes fails due to few image features.

Thus, the present application system helps a user to take pictures of an object from the same pose as an earlier photo, and to compare the photos. One scenario can be as follows:

[Step 1] User takes a photo of a target object.

[Step 2] When user wants to take another photo from the same angle as the first photo, AR navigation guides the user to the same camera angle.

[Step 3] A difference between the two photos is detected and shown.

Equipment and Background

Figure 2A:
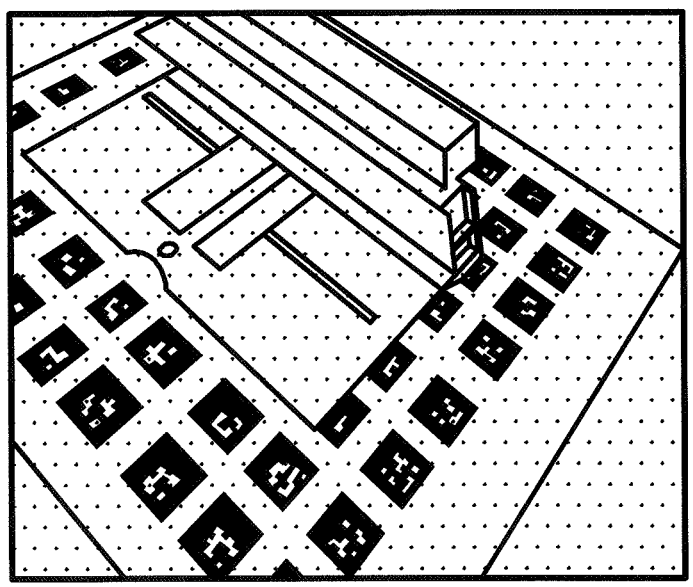
FIGS. 2(a) and 2(b) illustrate an example of AR-type markers on a table.
Figure 2B:
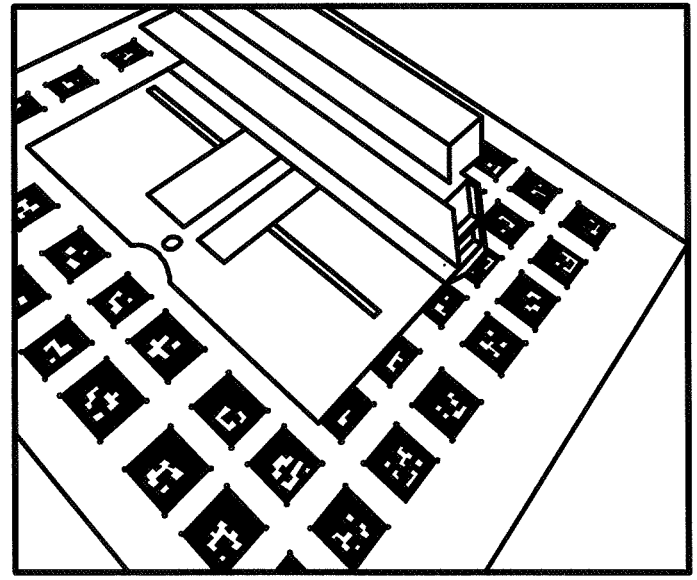

The system is based on a variation of Augmented Reality (AR) technologies. FIG. 1 shows an embodiment of the present invention with a camera 100 with an attached display 101. The system estimates three dimensional position and pose. Subsequently, AR type markers are put on a table as shown in FIG. 2(a). From the AR type marker in the captured image, the camera pose is estimated in real-time. Using the detected pose of the camera with the live feed, 3D graphics are rendered and overlaid on video. When a 3D model of the target object and its position is known, by using the estimated camera pose, the 3D model and photo are compared and subsequently matched together as shown in FIG. 2(b). The 3D model of the target object may not be as precise as a 3D CAD model. For example, it could be a rough VRML model reconstructed by computer vision technologies, such as a shape from motion method.

Note that the internal parameters of the camera, such as the optical image center, focal length, lens distortion and so on, are known by calibration.

Step 1: Taking the First Photo

In this step, a user takes a photo of the target object using the camera and stores the photo together with camera pose information.

Figure 3:
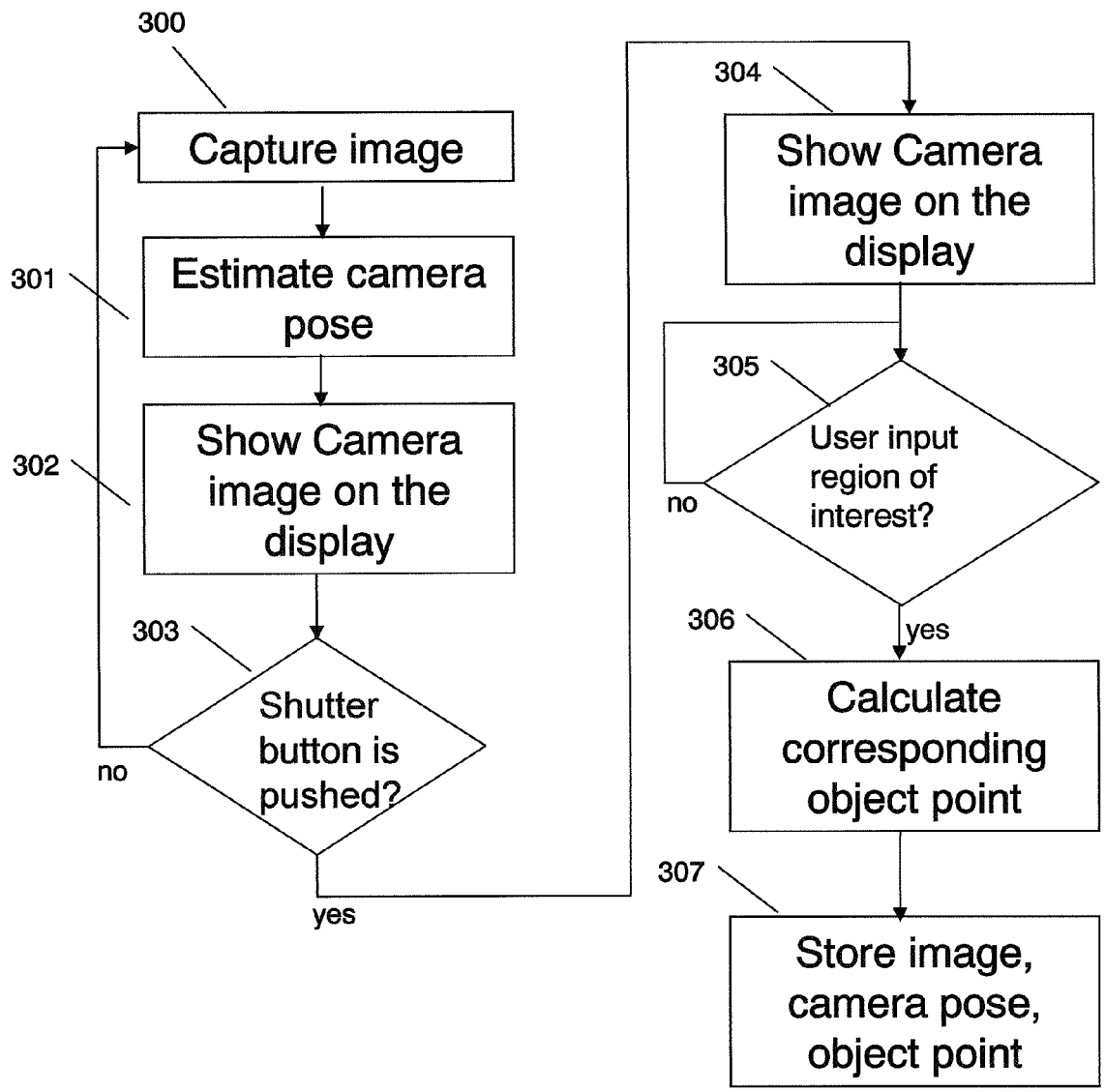
FIG. 3 illustrates an example flow chart for taking a photo.

FIG. 3 shows a flow chart of this step. A user takes video 300 of the target object using the camera. As described previously, the 3D pose 301 of the camera is estimated in real time. When the user pushes the shutter button in the display 303, a still photo image is taken and shown 304. Upon receiving an input for a region of interest 305, the corresponding object point on the model can be calculated 306, and the image, pose, and object point can be stored 307.

Figure 4:
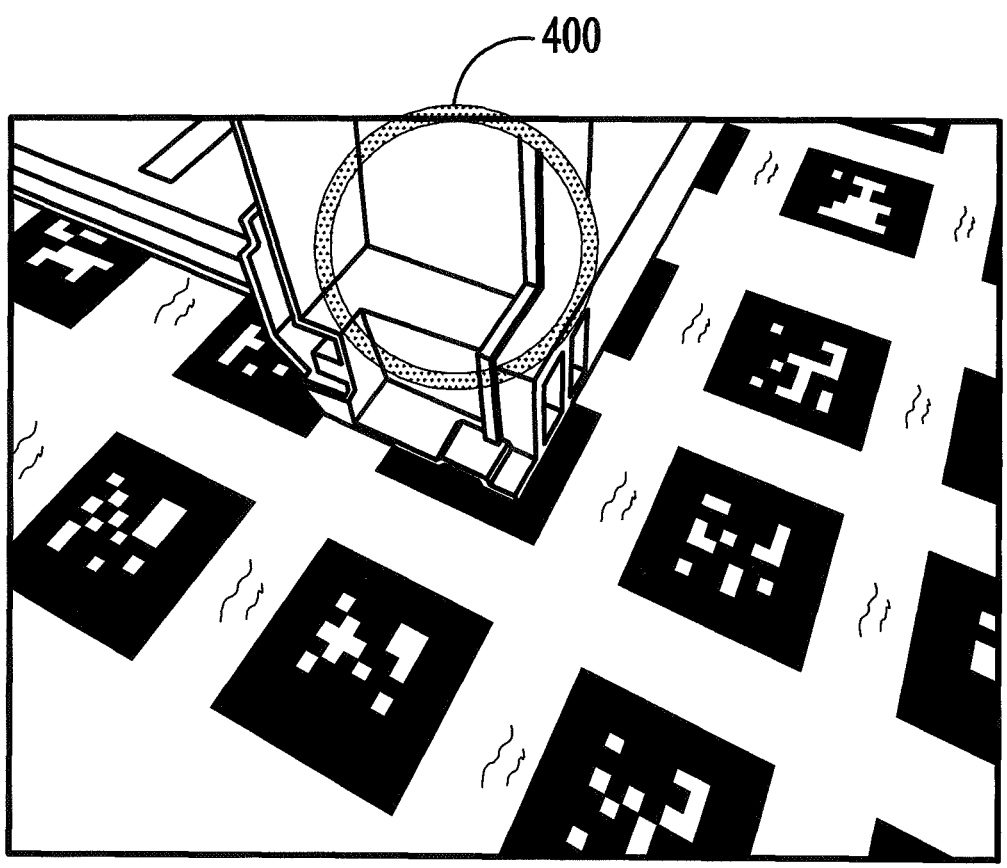
FIG. 4 illustrates an example of a circle indicating a region of interest.
Figure 5:
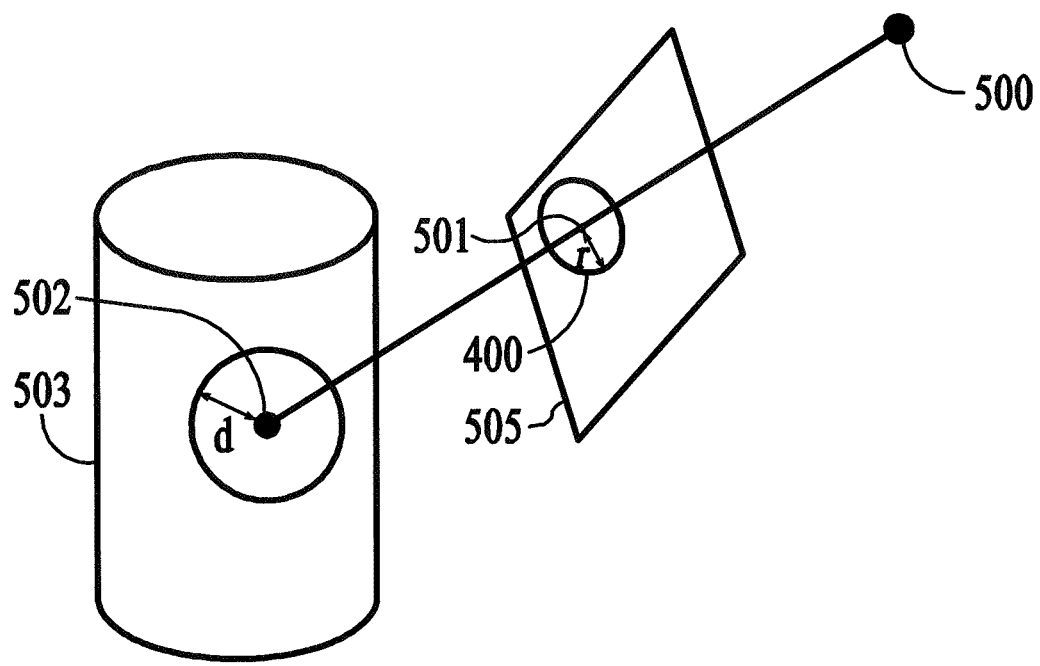
FIG. 5 illustrates an example geometrical relationship of the target object and camera.

An object point on the model is determined as follows. The user draws a circle 400 on the photo (FIG. 4) to specify a region of interest. The 3D model of the target object is matched with the photo and the 3D region corresponding to the circle is determined as follows. FIG. 5 shows the geometrical relationships between the target region, image, and camera. The camera position C 500 and center of the circle T 501 in the image positioned in 3D space 505 are determined from the estimated camera pose for the image and internal camera parameters. Then, the corresponding object point P 502 is calculated from the intersection of the vector T-C with the target object surface 503 as represented in the model. The radius r of the drawn circle becomes the radius d of the 3D sphere centered at point P:

$$d = \frac{|P-C|}{|T-C|} r$$

Figure 6:
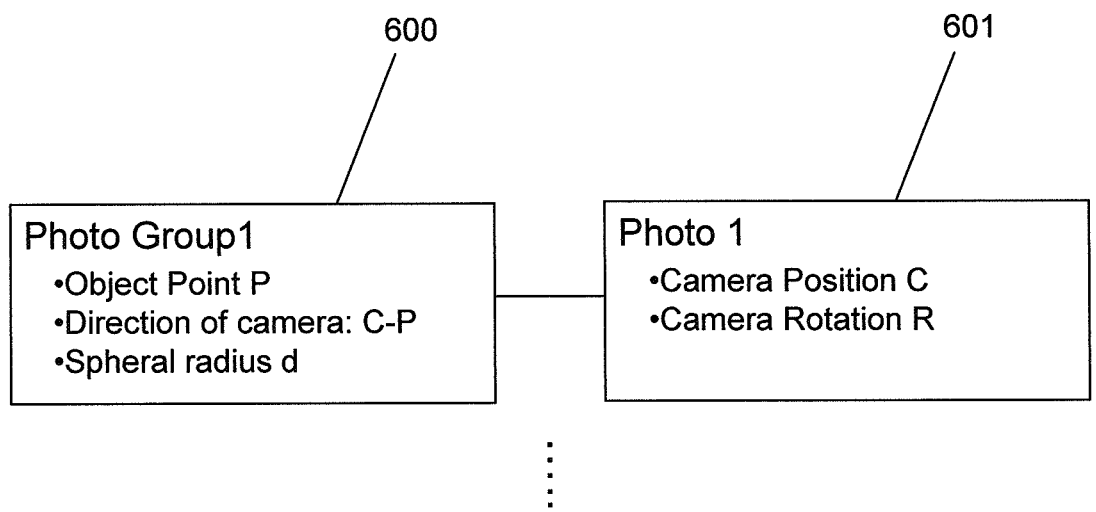
FIG. 6 illustrates an example data structure for the photo group.

FIG. 6 illustrates an example data structure for the photo group. The picture and its estimated parameters are saved in a database. When the first photo is saved, a new Photo Group table 600 is created. In the Photo Group table, the object point P, the vector from the object point to the camera C-P, and the radius d are saved. The photo and its camera position C and rotation R is saved as Photo 1 601 under the created Photo Group table. Future photos taken with this photo as a guide will be stored in this Photo Group. FIG. 6 is a sample of the data structure.

Additionally, there are some options to determine parameters. For example, when part of the drawn circle is out of image, the minimal distance r' between the center of the circle and edge of the photo can be used to avoid r becoming too large. Instead of determining a single corresponding object point P, multiple points on the object's surface that correspond to image points inside of the circle may be picked up, and their mean coordinate used. Instead of a circle, a rectangle could be used to specify the region of interest. If the user does not specify the image region, the system can use the entire photo as the image region, or an image region can be determined automatically using image processing techniques such as foreground extraction.

In the examples given thus far, the first photo is taken by a real camera. Alternatively, the first "photo" could be an image of the 3D model in the 3D viewer as taken by a virtual camera. A user manipulates the virtual camera with respect to the 3D model, and this virtual camera pose as the pose of the "first photo" which is used to guide the navigation to obtain pictures of the real object from the same point of view. This feature is useful when a user wants to take photos from the same angle as a view of a 3D model obtained in a 3D CAD viewer.

When there is no 3D model of the target model and its position, the object point P and radius d cannot be calculated as above. In this case, if the user specifies a distance between the target object and the camera, the object point P and radius d can be calculated. If the distance is not specified, the two parameters are not computed or saved in the database.

Step 2: Taking the Second Photo with AR Navigation

In this step, the AR navigation system is used to help users take a photo from a pose that is similar to the first photo.

Figure 7:
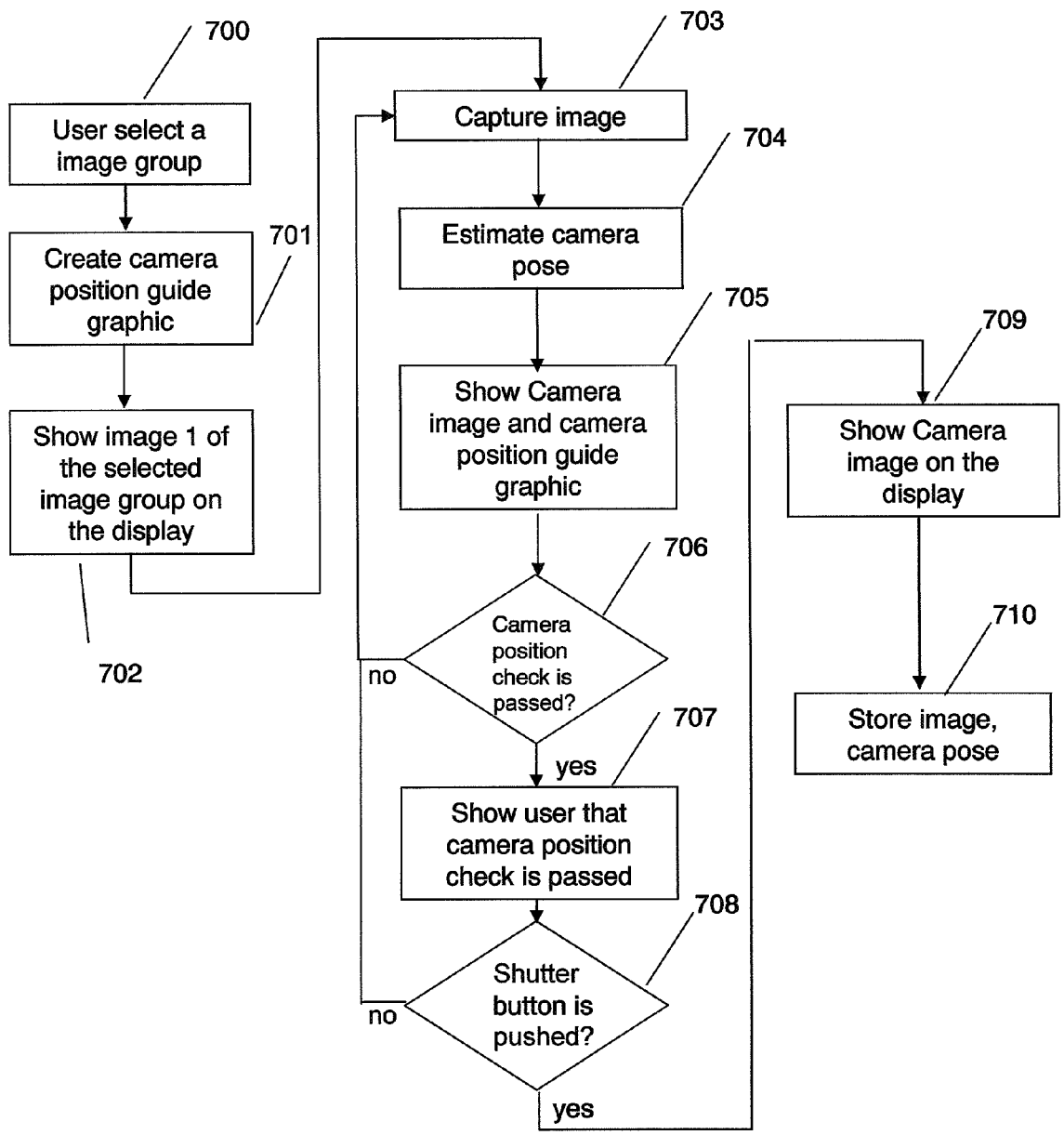
FIG. 7 illustrates an example flowchart for guiding a user to take a second photo with navigational aid.

FIG. 7 shows a flow chart for this step. First of all, a user selects the Photo Group 700 the user would like to use as a guide in taking the next photo. When the user selects a photo group, navigation graphics are created in the AR viewer 701, and Photo 1 of the chosen Photo Group is displayed 702. Subsequently, images (from live feed or from other sources) are captured 703, and camera poses can be estimated based on the feed 704 and the camera image, overlayed with navigation graphics, displayed to the user 705 to indicate the position of the current captured image relative to the selected photo. When the camera pose is sufficiently close to that of photo 706, the system shows the user that the current pose of the live feed has passed the camera check 707. Once the user presses the shutter 708, the camera image is stored, along with the camera pose 710, as an addition to Photo Group 700.

Figure 10A:
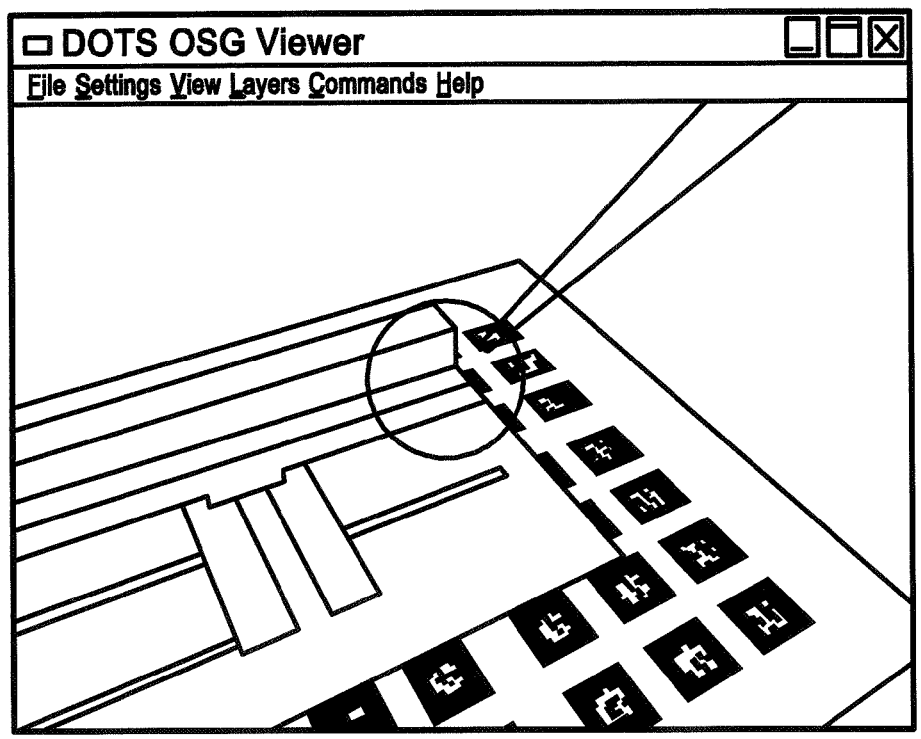
FIGS. 10(a) and 10(b) illustrate example AR views in different camera positions, including the cone and sphere graphics.
Figure 10B:
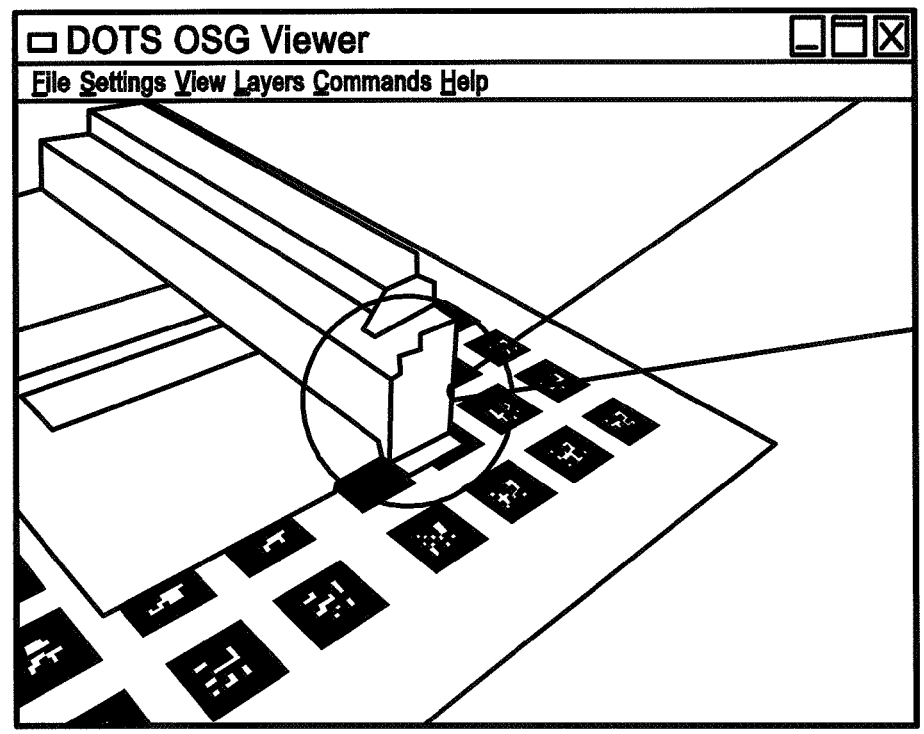

The camera pose of the live feed is continually estimated. Along with the estimated camera pose, the navigation graphics from the same view point are rendered and overlaid onto video images shown on the camera's view screen by using AR techniques. FIGS. 10(a) and 10(b) show the AR viewer from different camera positions. Users can understand the desired camera position by watching the AR viewer.

Optionally, when the camera position check 706 is passed, an event may be automatically triggered. An example of such an event is an automatic shutter, an alternative to the manual shutter operation performed by the user in steps 707 and 708 of FIG. 7. Another example is that once the check is passed, new information could be shown in the AR viewer. For example, the user may be interested in a sequence of views of the object. In this case, once a camera position check is passed, and a picture is taken, the AR viewer will automatically show graphics for the next view in the sequence. This feature is also useful outside of re-photography. For example, a worker may need to perform a number of steps on an object, such as take out a bolt and then open a hatch. The AR viewer may contain instructions and also graphics that guide the user to a view of the part of the object on which he needs to operate next.

Figure 8:
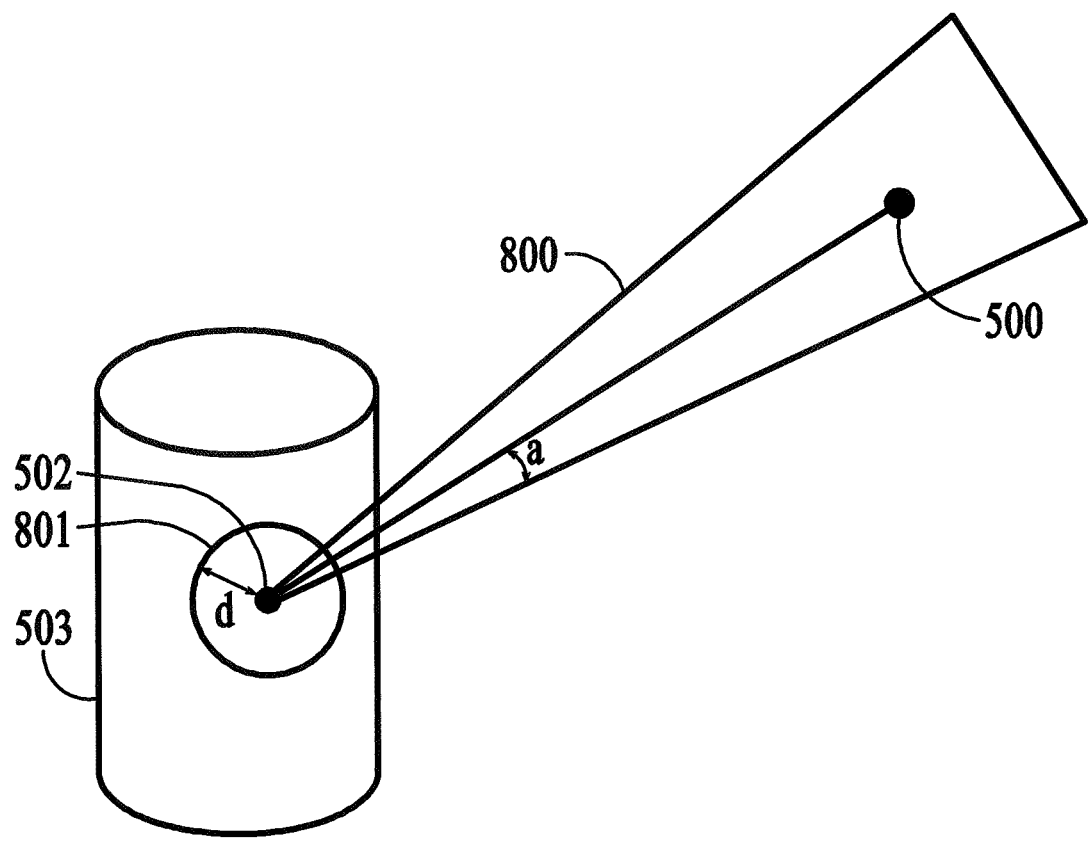
FIG. 8 illustrates the quantities and geometric relationships that determine the navigational cone and sphere graphics used in the inventive system.

Examples of the navigation graphics that can be used include a Cone Graphic 800 and a Sphere Graphic 801. They are created from the parameters of the Photo Group, as shown in FIG. 8.

Cone Graphic

The Cone Graphic is used to indicate to users the desired direction from object point P to camera position C. The direction is important for repeat photography. When the direction is different, occlusions can easily occur, which can generate many image regions that are captured in one photo but not in the other. On the other hand, the distance between the object point P and the camera position C, and the camera roll angle are not important factors for taking the same picture. Current cameras have sufficient resolution such that the differences are easily compensated by digital zooming and image rotation. Considering these aspects, the Cone Graphic is an excellent graphic to guide the user to the same direction from object point P. When the user brings the camera inside the Cone Graphic, the relative position of the camera from the object will be almost the same as in Photo 1.

The Cone Graphic is created from the object point P and camera-to-point direction C-P. The vertex of the Cone Graphic is located at P, and its axis is aligned with the vector C-P. The vertex angle a is a constant value.

Optionally, the vertex angle a can be changed dynamically. The vertex angle a indicates how much difference in direction is acceptable. If an object's surface is almost flat, the direction angle is not as sensitive as for complicated shapes. The system can use disparity between the object's surface around point P from the 3D model, or simply use the image frequency of the first photo, to determine angle a.

Sphere Graphic

Discrepancies between the pan and tilt angles of the camera and the desired pose are not as important for taking a repeat photo as making sure that the region of interest of a target object is inside the field of view. The Sphere Graphic is rendered to tell the user the position and size of the region of interest. The system centers the Sphere Graphic of radius d at the position of object point P. When the Sphere Graphic is captured in the image, the region of interest will be captured in the photo. The system may take the radius of the Sphere Graphic to be larger than d just to be safe.

Figure 9:
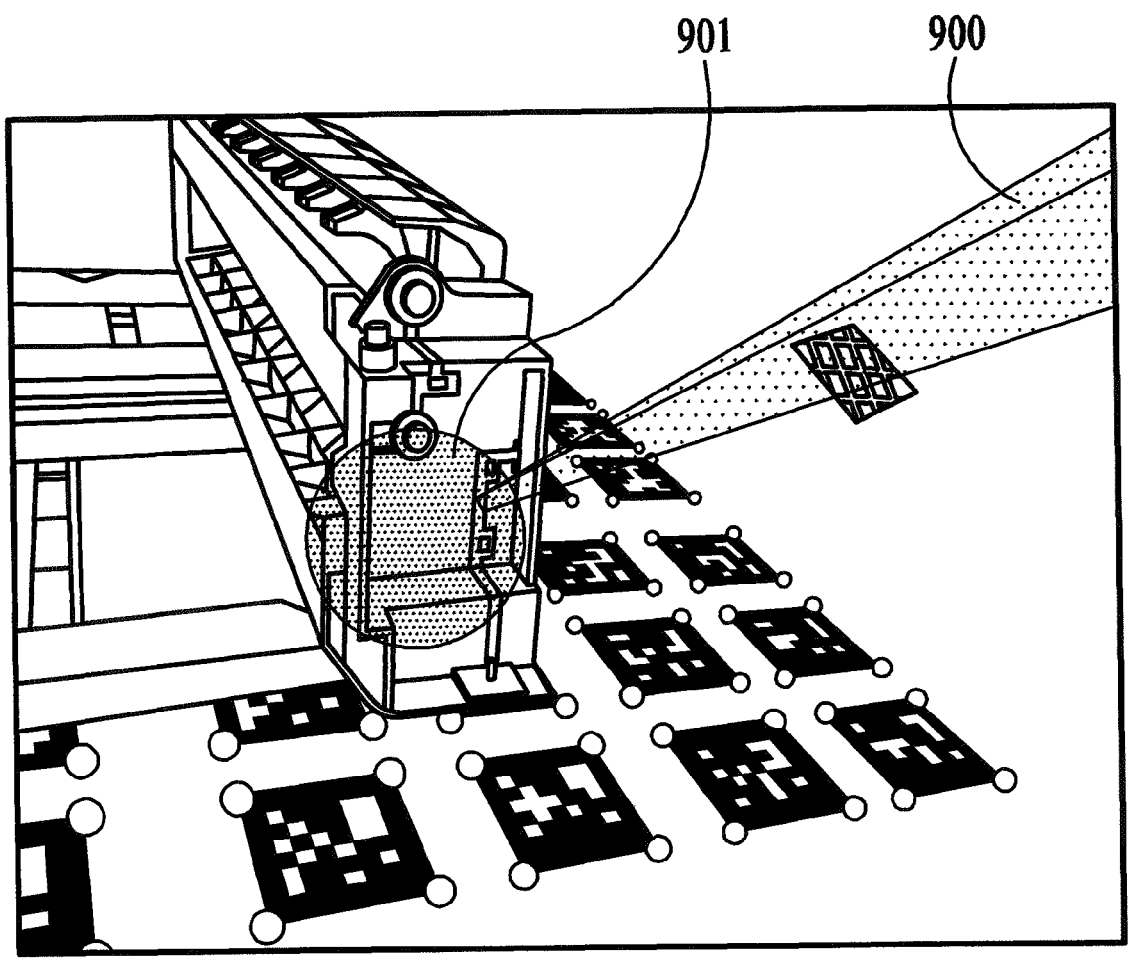
FIG. 9 illustrates examples of the cone graphic and the sphere graphic created from the data of the photo group.

FIG. 9 provides examples of the Cone Graphic 900 and the Sphere Graphic 901, which are created from the data of a Photo Group.

Figure 11:
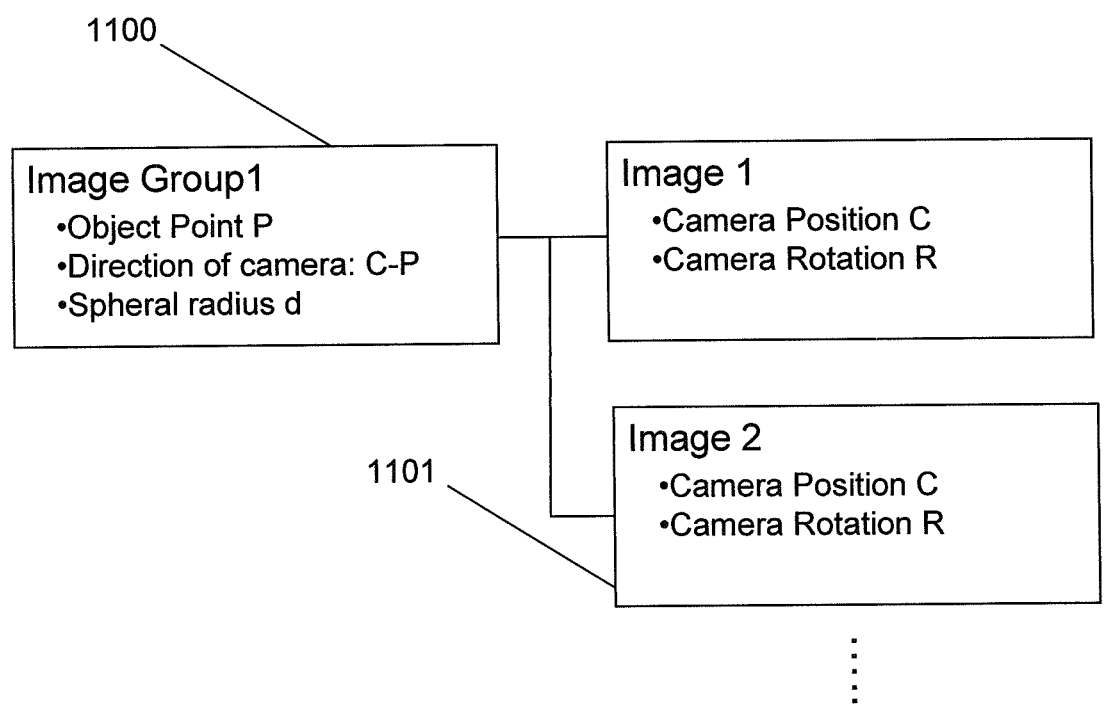
FIG. 11 illustrates an example of stored data, after a second photo is added to photo group 1.

When the current camera pose is inside of the Cone Graphic and the Sphere Graphic is also inside the field of view of the camera, the current camera pose passes the camera pose check and the system indicates graphically that the pose is good for capture. For example, the navigation graphics turns red and the shutter button is enabled. When the user, pushes the shutter button, the photo and its camera position data are saved under the same Photo Group. FIG. 11 is an example of data stored after Photo 2 1101 is added to Photo Group 1 1100.

Figure 12:
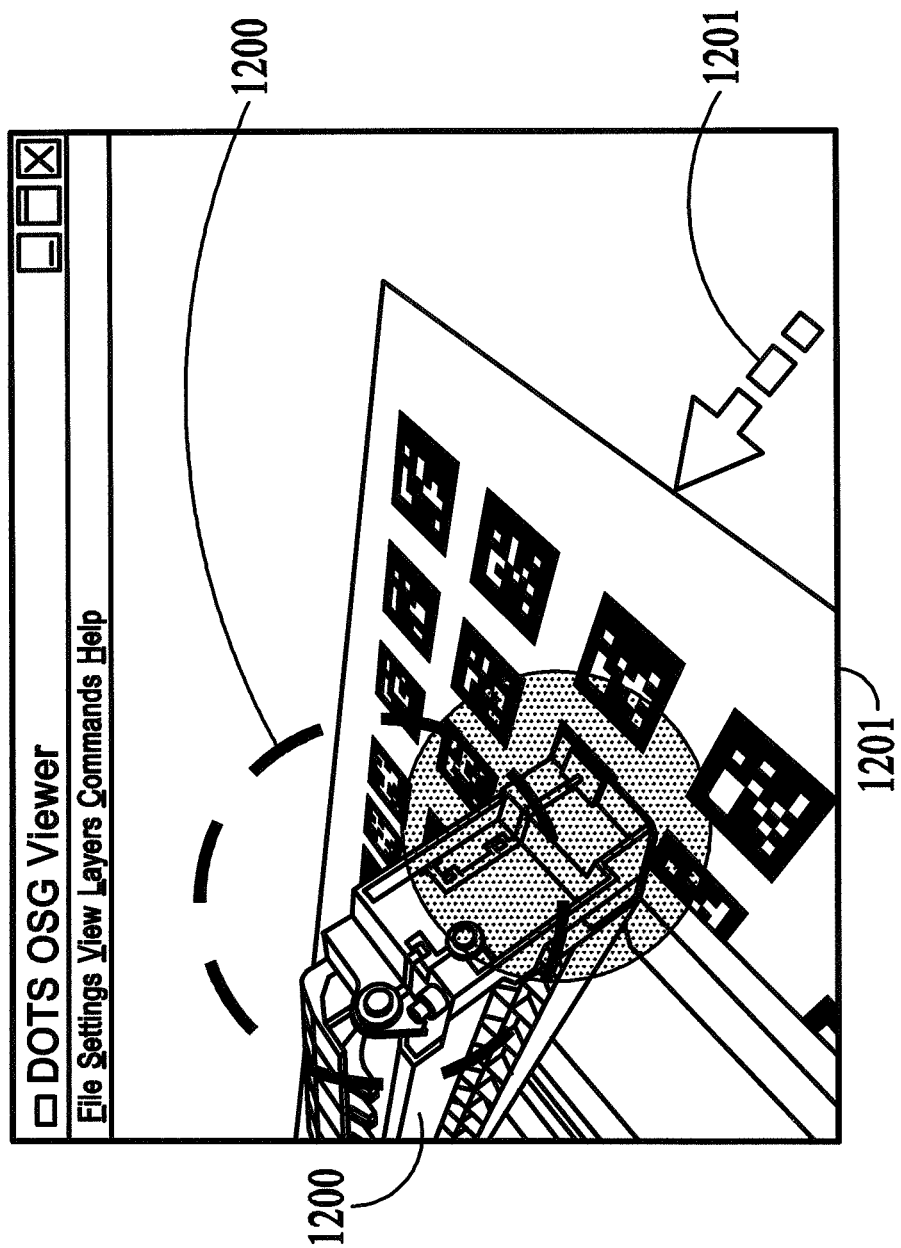
FIG. 12 illustrates additional graphics, such as a circle guide graphic and up direction arrow, that can be utilized in the inventive system.

When the current camera pose passes the check, there still is some freedom in the camera pose. Additional graphics can be used to restrict this freedom (FIG. 12):

Distance between object and camera: As the camera gets closer to Object point P, the Sphere Graphic gets larger. Displaying a fixed sized circle in the AR viewer, enables to users to judge how large the Sphere Graphic has become. Alternatively, signs such as "go forward" and "go backward" can be shown when the camera is too close.

Image position of Object Position P: A circle graphic 1200 can be placed at the same position as in the first photo. When the position of the Sphere Graphic becomes the same as the circle graphic, Object Position P is captured in the same image pose as the first photo.

Camera roll angle: Camera up direction 1201 is displayed as an arrow graphic in AR viewer. When the arrow graphic becomes vertical, the camera roll angle is the same as for the first photo.

Figure 13:
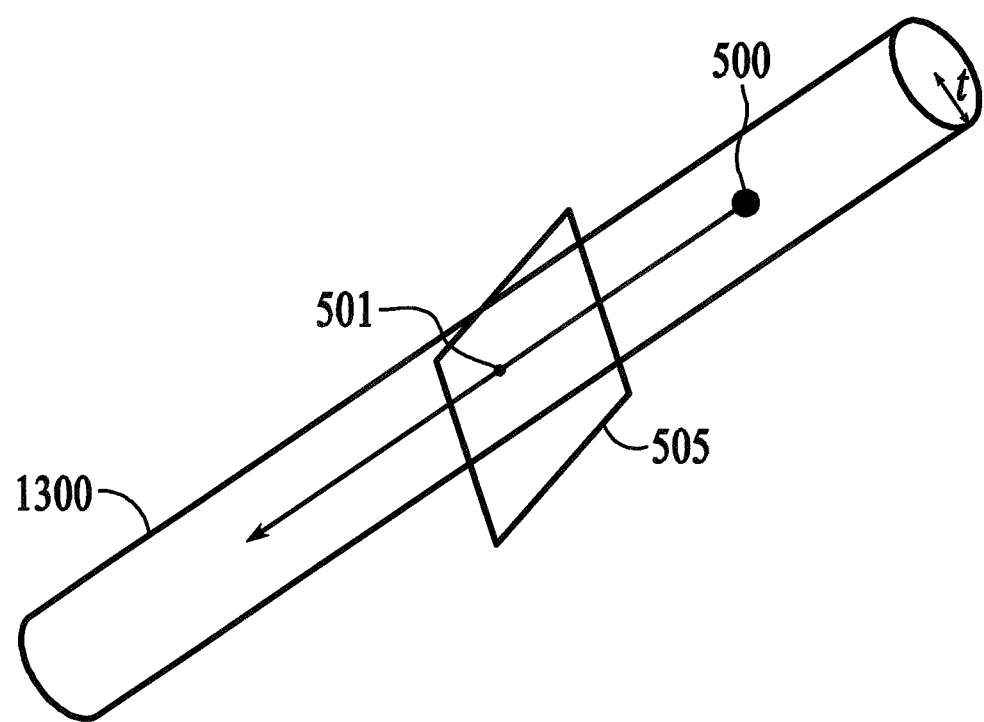
FIG. 13 illustrates the quantities and geometric relationships that determine the cylinder graphic.

When there is no 3D model of the target object, and no object point P and radius d are found in the database, other 3D graphics are used. FIG. 13 shows a Cylinder Graphic 1300, with axis aligned with vector T-C. The radius t of the Cylinder Graphic is a preset value. When the current camera position is inside of the Cylinder Graphic, and the current camera optical direction aligns with the vector T-C, the current camera pose passes the position check.

Though the embodiments thus far utilized AR 3D graphics to guide the camera pose, voice navigation could be used instead, or in addition. Voice commands, such as "Go right", "Aim up" etc., can be used to guide the user to the first camera position and angle.

Step 3: Comparison of Two Photos Taken in Different Poses

After photos are taken from the same angle, an embodiment of the present invention detects differences between the photos. The navigation graphics helps the user take photos from the same camera angle, but the navigation doesn't promise perfect correspondence. Every photo has its camera pose information, and the target object model is aligned. An embodiment of the present invention utilizes 3D graphics techniques to adjust photos to better compare them.

Utilizing texture projection techniques, the texture from a photo can be projected from the camera position onto the 3D model. Because these geometries are registered well, the texture is projected accurately.

Figure 14:
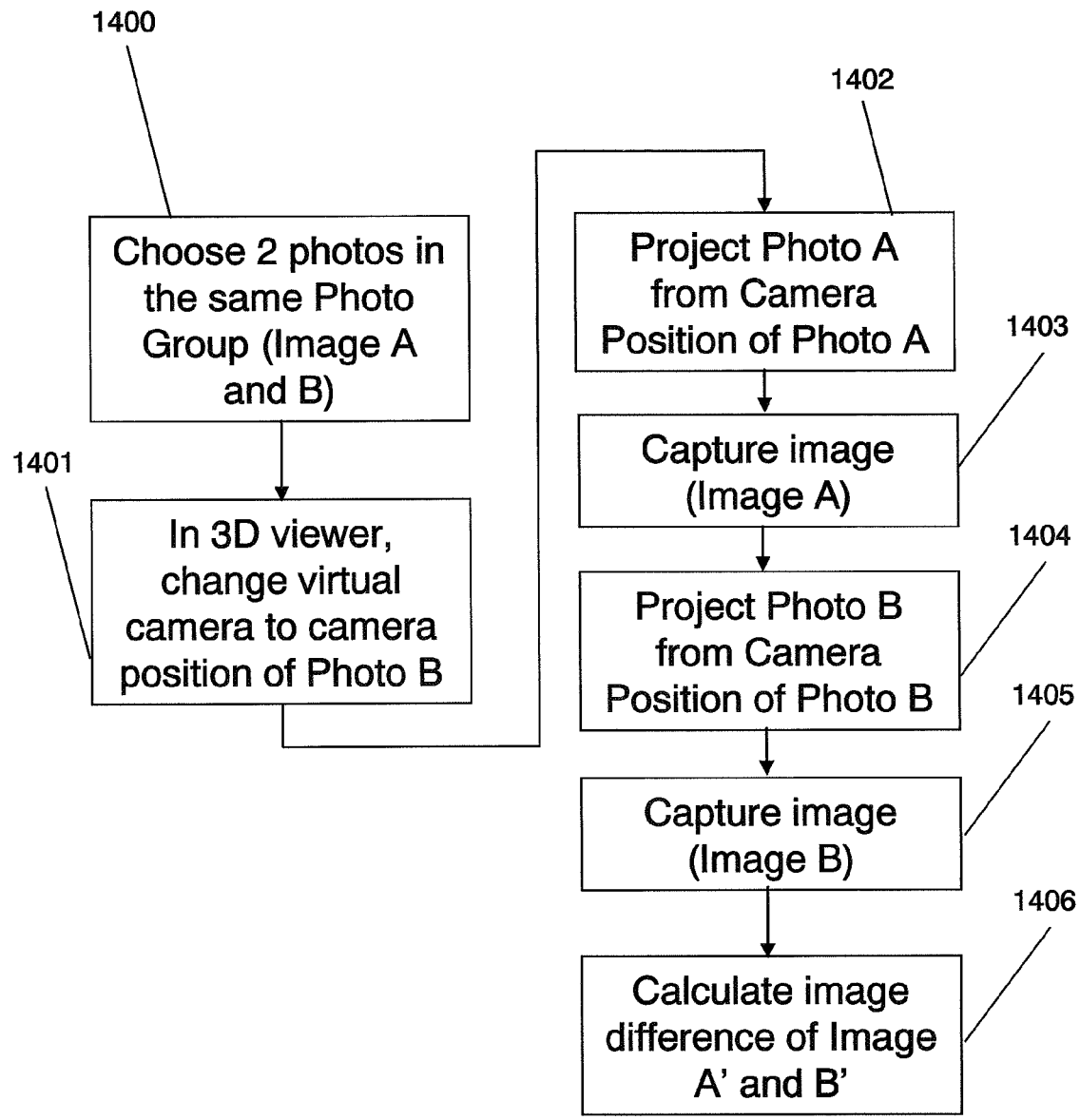
FIG. 14 illustrates an example flow chart for taking the difference between photos.

FIG. 14 shows a flow chart of Step 3. The user chooses Photo A and B in the same Photo Group as source images 1400. By default, they are Photo 1 (the first photo) and the latest photo. To view photo A as if it had been taken from the vantage of photo B, within the 3D viewer the virtual camera display is set to the pose associated with photo B 1401, and photo A is projected onto the model from the camera pose of photo A 1402, whereupon an image with photo A's content from photo B's viewpoint is captured 1403. Photo B is then projected from the camera pose associated with photo B 1404, and a second image is captured 1405. After the two projections and captures have been completed, the system can calculate the image differences 1406.

Figure 15:
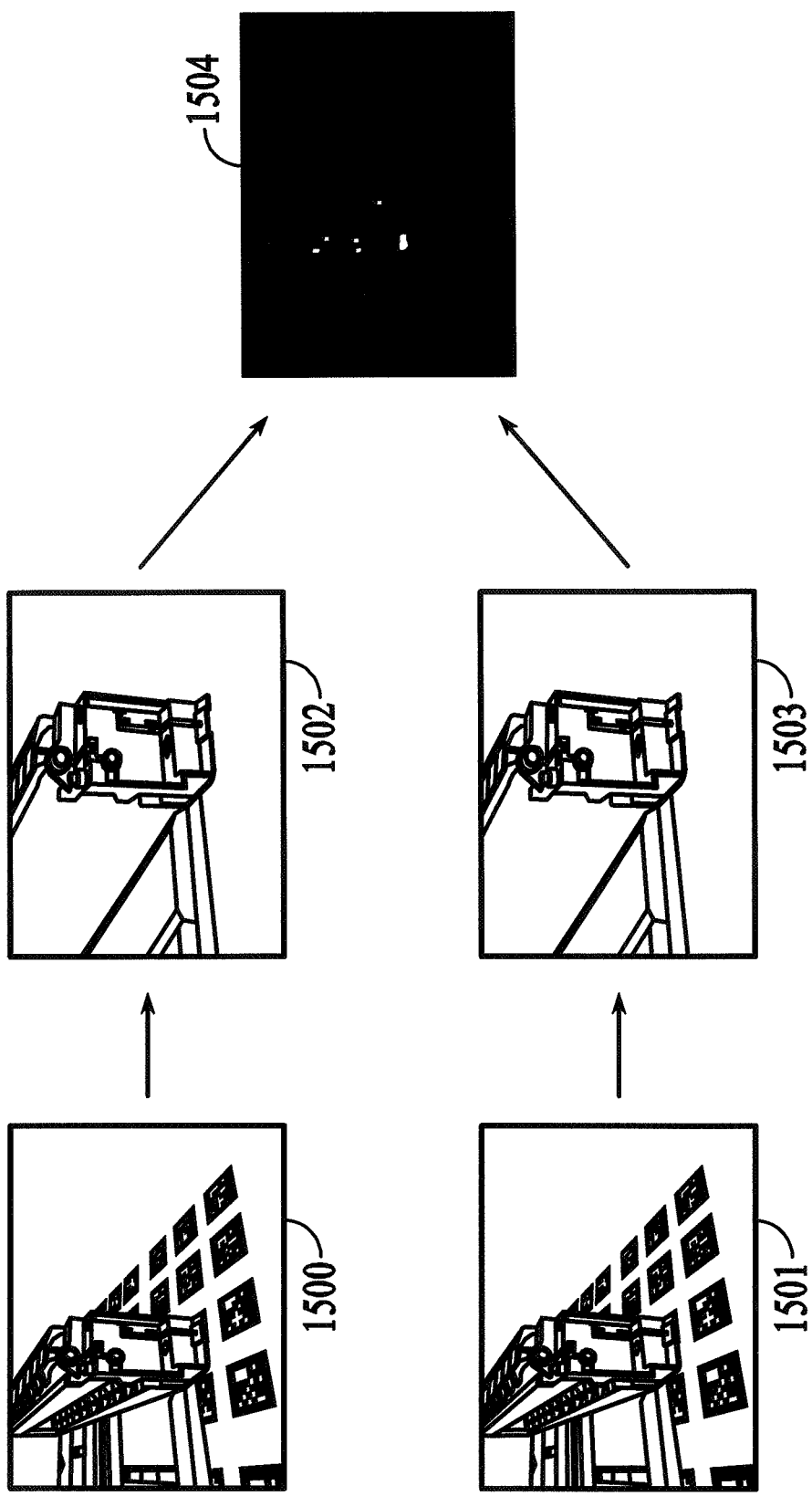
FIG. 15 illustrates an example of the difference detection.

FIG. 15 shows an example of difference detection. The two source photos 1500 and 1501 are almost the same, but have a different camera angle. In a 3D graphics engine, the virtual camera is aligned with the camera position of Photo B 1501, setting the internal parameters to be the same as original camera. The texture of Photo A 1500 is projected from camera position of Photo A, and the rendered graphics are captured as Projected Image A' 1502. The Projected Image A' can now be viewed from the same camera angle as Photo B. The system can then create and capture Projected Image B' 1503. Using image subtraction methods, differences between the two projected images can be detected 1504.

Figure 16:
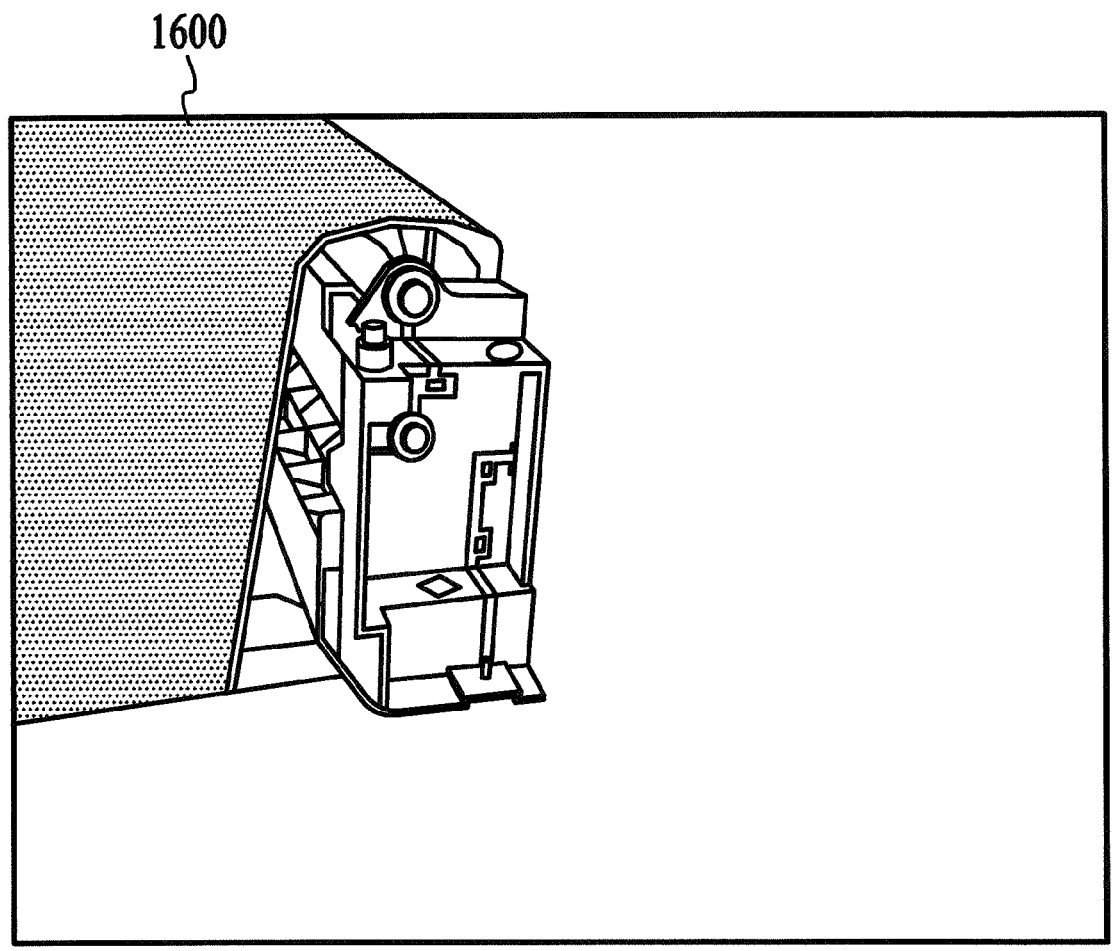
FIG. 16 illustrates an example of the handling of occluded regions.

When Projected Images are captured, some object surfaces are not captured by the camera. This occurs when they are not in the field of view of the camera, or when they are occluded by an object. FIG. 16 shows an example. These areas should not be considered in the discrepancy analysis. One method the system uses is to paint a black color on any parts of the object's surface 1600 that were not captured. These are then excluded when detecting differences.

Figure 17A:
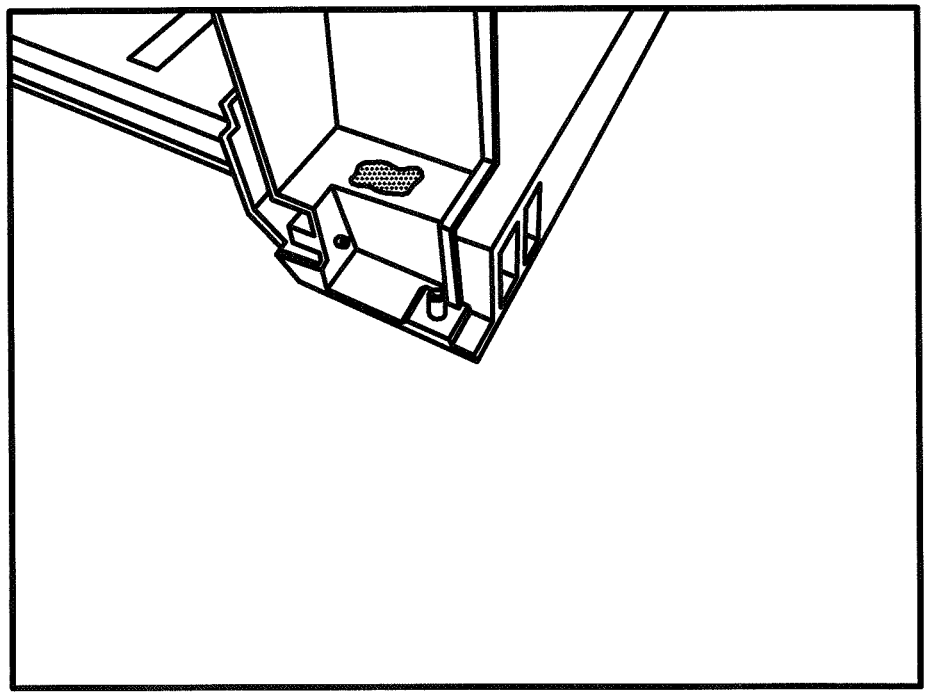
FIGS. 17(a) and 17(b) illustrate the difference detection as projected onto the 3D model.
Figure 17B:
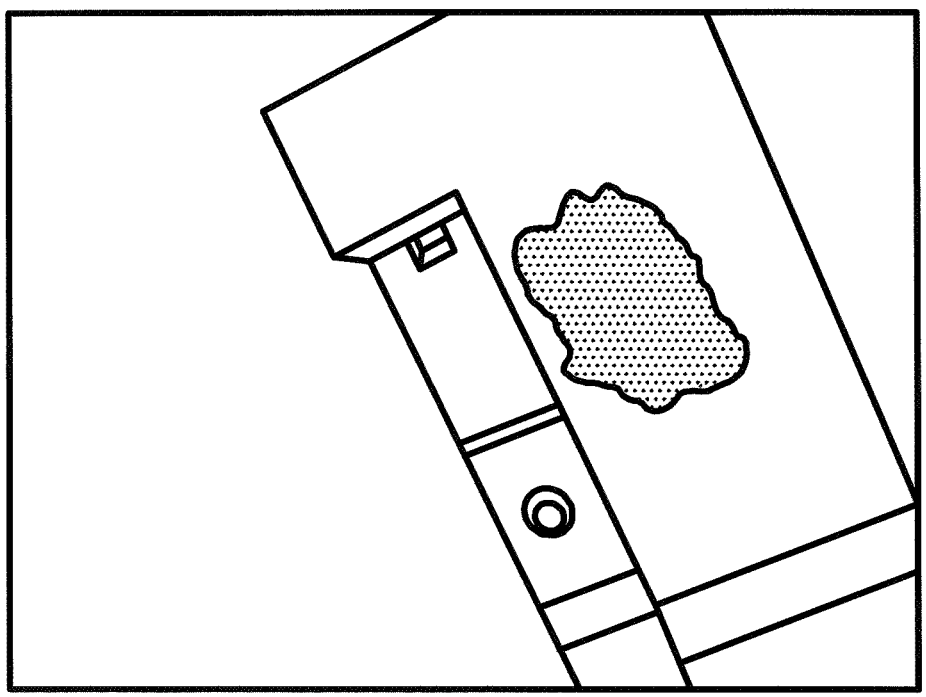

The detected image difference can be highlighted to indicate to the user a region of interest. Alternatively, the detected image region can be cropped and projected onto the 3D model for the user. The user can manipulate the 3D model to understand the differences better, by using the 3D context, as shown in FIGS. 17(*a*) and 17(*b*).

Figure 18:
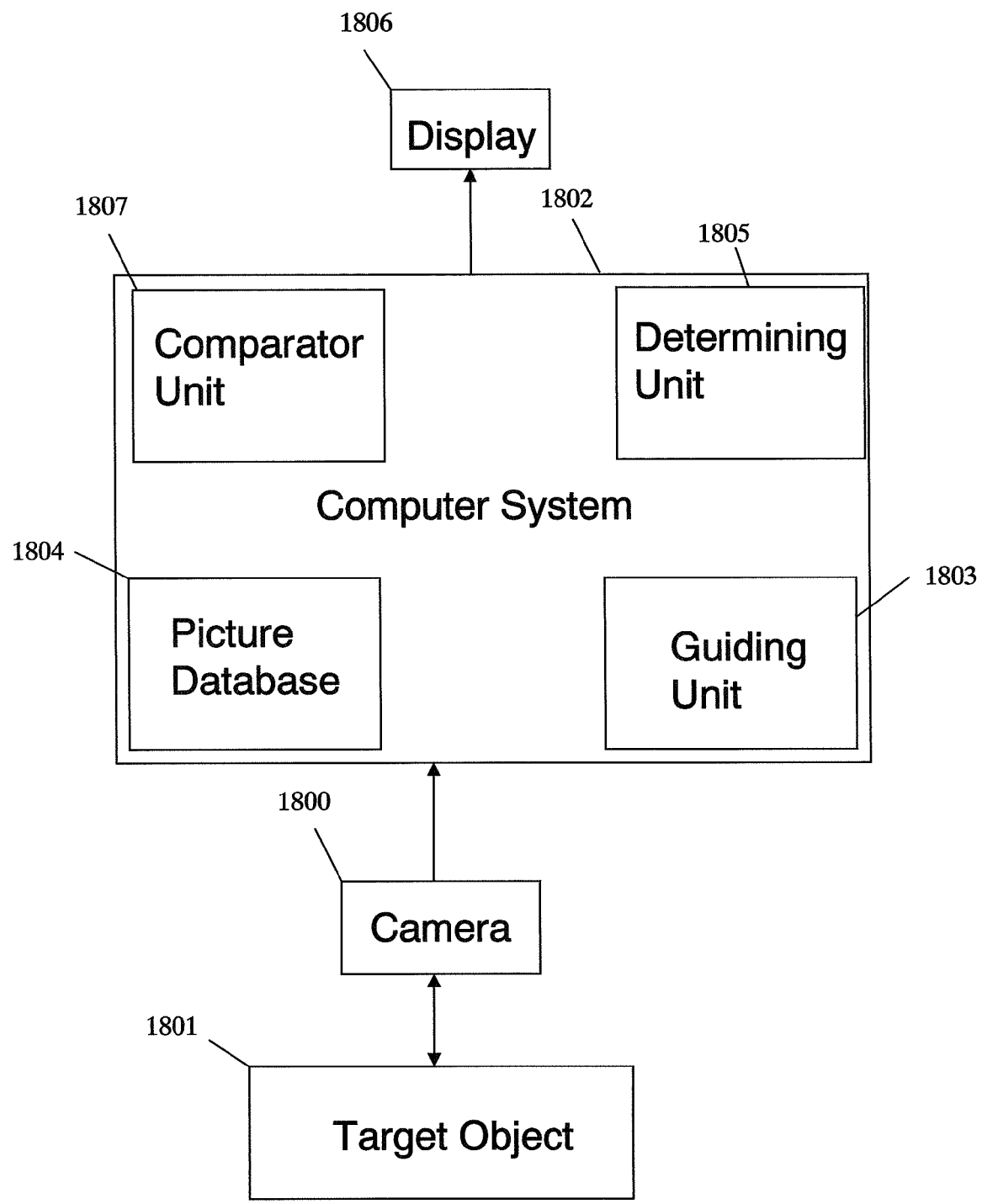
FIG. 18 illustrates an example functional diagram of a computer system in which an embodiment of the invention may be implemented.

FIG. 18 illustrates an example functional diagram of a computer system in which an embodiment of the invention may be implemented. A camera 1800 receiving live feed of the target object 1801 forwards the live feed to the computer system 1802. The comparator unit 1807 processes the live feed and compares the images from the live feed to a database of pictures with pose information with respect to a target object 1804. Subsequently a determining unit 1805 determines camera angles and a position associated with an object to be captured. The determining unit may also determine angles and a position associated with the live feed relative to the object to be captured. A guiding unit 1803 provides a first indication indicating an angle associated with the object to be captured relative to the live feed, and provides a second indication indicating the position of the object to be captured relative to the live feed. A third indication may also be provided if the angle and position associated with the live feed is within a specified tolerance to the angle and position of the object to be captured.

Figure 19:
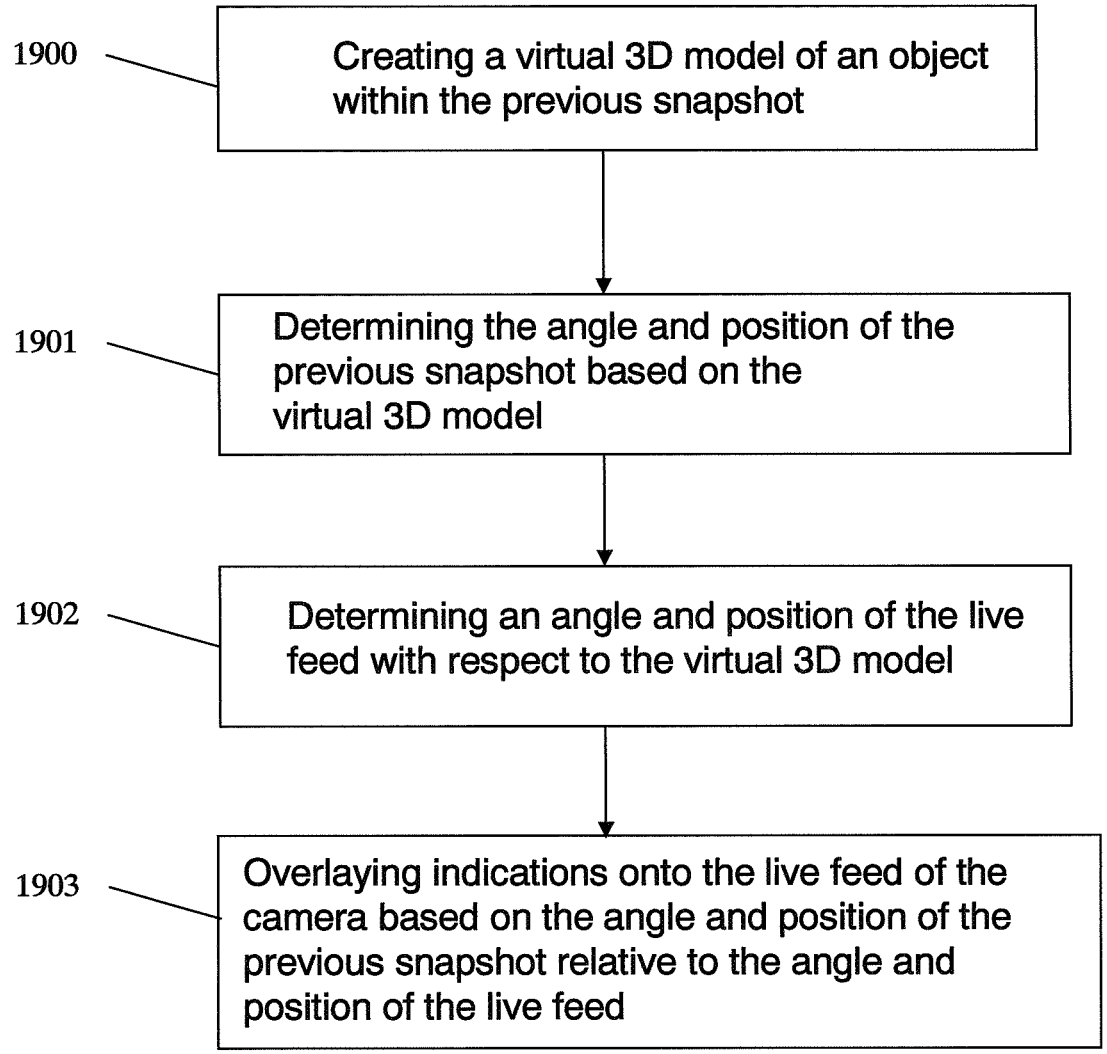
FIG. 19 illustrates an example flow chart of a method utilized by the computer system.

FIG. 19 illustrates an example flow chart of a method utilized by the computer system. First a virtual 3D model of an object and the previous snapshot 1900 are aligned using visual features such as AR type markers. Subsequently, the angles and the position of the previous snapshot are determined based on the virtual 3D model 1901. Then the angle and position of the live feed is determined with respect to the virtual 3D model 1902. Indications can then be overlaid onto the live feed of the camera based on the angle and position of the previous snapshot relative to the angle and position of the live feed 1903.

Figure 20:
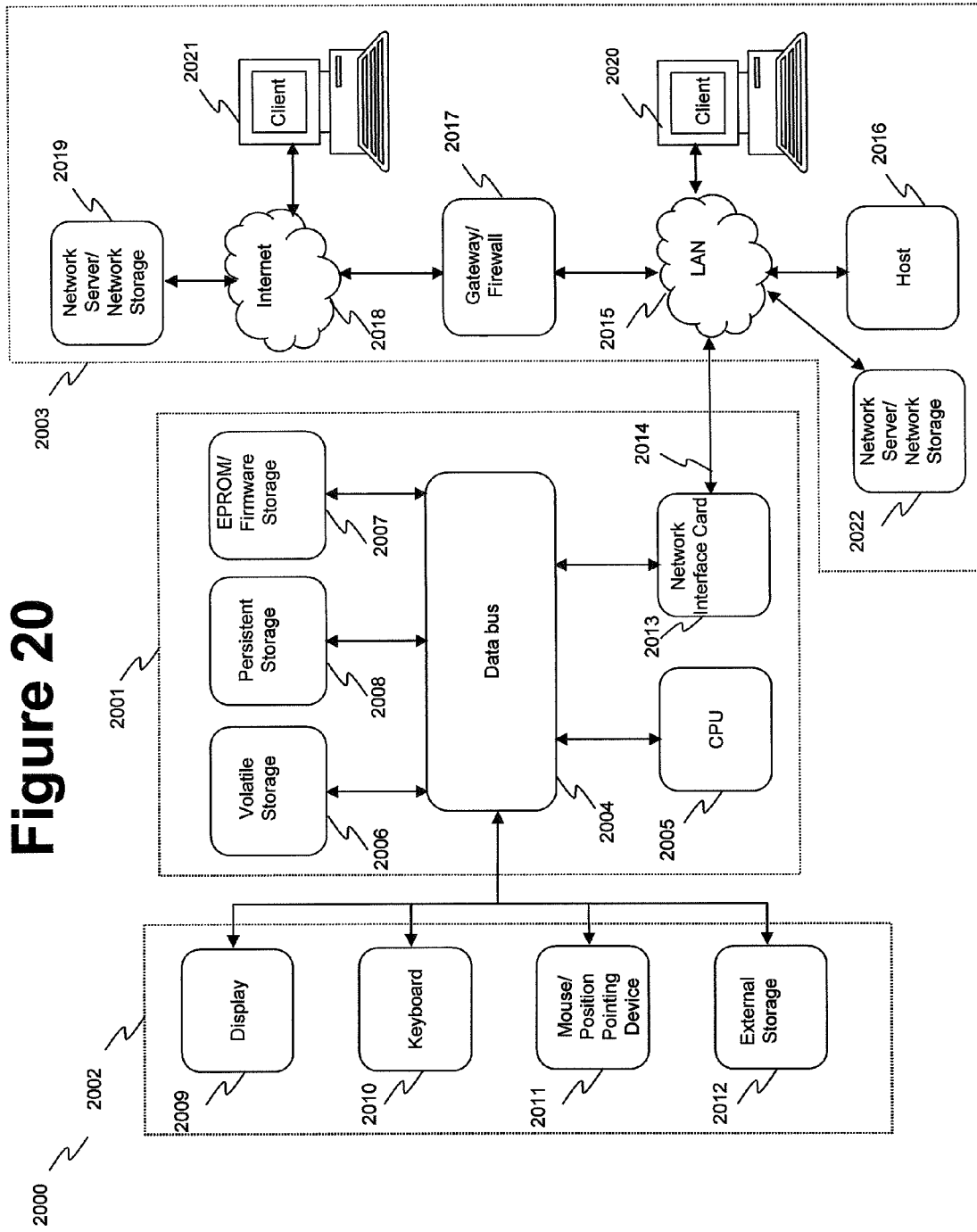
FIG. 20 illustrates an exemplary embodiment of a computer platform upon which the inventive system may be implemented.

FIG. 20 illustrates an exemplary embodiment of a computer platform upon which the inventive system may be implemented.

FIG. 20 is a block diagram that illustrates an embodiment of a computer/server system 2000 upon which an embodiment of the inventive methodology may be implemented. The system 2000 includes a computer/server platform 2001, peripheral devices 2002 and network resources 2003.

The computer platform 2001 may include a data bus 2005 or other communication mechanism for communicating information across and among various parts of the computer platform 2001, and a processor 2005 coupled with bus 2001 for processing information and performing other computational and control tasks. Computer platform 2001 also includes a volatile storage 2006, such as a random access memory (RAM) or other dynamic storage device, coupled to bus 2005 for storing various information as well as instructions to be executed by processor 2005. The volatile storage 2006 also may be used for storing temporary variables or other intermediate information during execution of instructions by processor 2005. Computer platform 2001 may further include a read only memory (ROM or EPROM) 2007 or other static storage device coupled to bus 2005 for storing static information and instructions for processor 2005, such as basic input-output system (BIOS), as well as various system configuration parameters. A persistent storage device 2008, such as a magnetic disk, optical disk, or solid-state flash memory device is provided and coupled to bus 2001 for storing information and instructions.

Computer platform 2001 may be coupled via bus 2005 to a display 2009, such as a cathode ray tube (CRT), plasma display, or a liquid crystal display (LCD), for displaying information to a system administrator or user of the computer platform 2001. An input device 2010, including alphanumeric and other keys, is coupled to bus 2001 for communicating information and command selections to processor 2005. Another type of user input device is cursor control device 2011, such as a mouse, a trackball, or cursor direction keys for communicating direction information and command selections to processor 2005 and for controlling cursor movement on display 2009. This input device typically has two degrees of freedom in two axes, a first axis (e.g., x) and a second axis (e.g., y), that allows the device to specify positions in a plane.

An external storage device 2012 may be coupled to the computer platform 2001 via bus 2005 to provide an extra or removable storage capacity for the computer platform 2001. In an embodiment of the computer system 2000, the external removable storage device 2012 may be used to facilitate exchange of data with other computer systems.

The invention is related to the use of computer system 2000 for implementing the techniques described herein. In an embodiment, the inventive system may reside on a machine such as computer platform 2001. According to one embodiment of the invention, the techniques described herein are performed by computer system 2000 in response to processor 2005 executing one or more sequences of one or more instructions contained in the volatile memory 2006. Such instructions may be read into volatile memory 2006 from another computer-readable medium, such as persistent storage device 2008. Execution of the sequences of instructions contained in the volatile memory 2006 causes processor 2005 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2005 for execution. The computer-readable medium is just one example of a machine-readable medium, which may carry instructions for implementing any of the methods and/or techniques described herein. Such a medium may take many forms, including but not limited to, non-volatile media and volatile media. Non-volatile media includes, for example, optical or magnetic disks, such as storage device 2008. Volatile media includes dynamic memory, such as volatile storage 2006.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, an EPROM, a FLASH-EPROM, a flash drive, a memory card, any other memory chip or cartridge, or any other medium from which a computer can read.

Various forms of computer readable media may be involved in carrying one or more sequences of one or more instructions to processor 2005 for execution. For example, the instructions may initially be carried on a magnetic disk from a remote computer. Alternatively, a remote computer can load the instructions into its dynamic memory and send the instructions over a telephone line using a modem. A modem local to computer system can receive the data on the telephone line and use an infra-red transmitter to convert the data to an infra-red signal. An infra-red detector can receive the data carried in the infra-red signal and appropriate circuitry can place the data on the data bus 2005. The bus 2005 carries the data to the volatile storage 2006, from which processor 2005 retrieves and executes the instructions. The instructions received by the volatile memory 2006 may optionally be stored on persistent storage device 2008 either before or after execution by processor 2005. The instructions may also be downloaded into the computer platform 2001 via Internet using a variety of network data communication protocols well known in the art.

The computer platform 2001 also includes a communication interface, such as network interface card 2013 coupled to the data bus 2005. Communication interlace 2013 provides a two-way data communication coupling to a network link 2015 that is coupled to a local network 2015. For example, communication interface 2013 may be an integrated services digital network (ISDN) card or a modem to provide a data communication connection to a corresponding type of telephone line. As another example, communication interface 2013 may be a local area network interface card (LAN NIC) to provide a data communication connection to a compatible LAN. Wireless links, such as well-known 802.11a, 802.11b, 802.11 g and Bluetooth may also used for network implementation. In any such implementation, communication interface 2013 sends and receives electrical, electromagnetic or optical signals that carry digital data streams representing various types of information.

Network link 2013 typically provides data communication through one or more networks to other network resources. For example, network link 2015 may provide a connection through local network 2015 to a host computer 2016, or a network storage/server 2017. Additionally or alternatively, the network link 2013 may connect through gateway/firewall 2017 to the wide-area or global network 2018, such as an Internet. Thus, the computer platform 2001 can access network resources located anywhere on the Internet 2018, such as a remote network storage/server 2019. On the other hand, the computer platform 2001 may also be accessed by clients located anywhere on the local area network 2015 and/or the Internet 2018. The network clients 2020 and 2021 may themselves be implemented based on the computer platform similar to the platform 2001.

Local network 2015 and the Internet 2018 both use electrical, electromagnetic or optical signals that carry digital data streams. The signals through the various networks and the signals on network link 2015 and through communication interface 2013, which carry the digital data to and from computer platform 2001, are exemplary forms of carrier waves transporting the information.

Computer platform 2001 can send messages and receive data, including program code, through the variety of network(s) including Internet 2018 and LAN 2015, network link 2015 and communication interface 2013. In the Internet example, when the system 2001 acts as a network server, it might transmit a requested code or data for an application program running on client(s) 2020 and/or 2021 through Internet 2018, gateway/firewall 2017, local area network 2015 and communication interface 2013. Similarly, it may receive code from other network resources.

The received code may be executed by processor 2005 as it is received, and/or stored in persistent or volatile storage devices 2008 and 2006, respectively, or other non-volatile storage for later execution.

It should be noted that the present invention is not limited to any specific firewall system. The inventive policy-based content processing system may be used in any of the three firewall operating modes and specifically NAT, routed and transparent.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, perl, shell, PHP, Java, etc.

Moreover, other implementations of the invention will be apparent to those skilled in the art from consideration of the specification and practice of the invention disclosed herein. Various aspects and/or components of the described embodiments may be used singly or in any combination in the system for AR navigation for repeat photography and difference extraction. It is intended that the specification and examples be considered as exemplary only, with a true scope and spirit of the invention being indicated by the following claims.

What is claimed is:

1. A system, comprising:
    a camera receiving live feed;
    a database of pictures;
    a determining unit determining an angle and a position associated with an object to be captured, wherein the determining unit determines a plurality of angles and a position associated with the live feed relative to the object to be captured;
    a guiding unit providing a first indication being overlaid onto the live feed and displayed on a display device to indicate the angle associated with the object to be captured relative to the live feed, and providing a second indication being overlaid onto the live feed and displayed on the display device to indicate the position of the object to be captured relative to the live feed, and wherein a third indication is provided if at least one angle in the plurality of angles and the position associated with the live feed is within a specified tolerance to the angle and position of the object to be captured;
    wherein said first and second indications are simultaneously overlaid onto the live feed,
    wherein the first indication is represented by a cone, wherein a vertex of the cone is located at the object and an axis of the cone is extended in a camera-to-object direction, and
    a vertex angle formed between the vertex and the axis indicates an amount of difference between the live feed and the object that is acceptable.

2. The system of claim 1, further comprising a virtual 3D model.

3. The system of claim 2, wherein the guiding unit utilizes the first and second indications to indicate at least one angle and position of the virtual 3D model relative to the live feed.

4. The system of claim 2, further comprising a comparator unit, the comparator unit analyzing and highlighting visual differences between a snapshot from the live feed and a selected picture from the database of pictures.

5. The system of claim 4, wherein the comparator unit uses geometry of the virtual 3D model to aid in conducting difference detection and wherein the snapshot is within the specified tolerance of the object to be captured.

6. The system of claim 1, wherein the third indication is a color change of the first indication and the second indication when the position associated with the live feed is within a specified tolerance to the angle and position of the object to be captured.

7. The system of claim 1, wherein a vector associated with the object to be captured and a width representing the specified tolerance is calculated.

8. The system of claim 4, wherein the comparator unit analyzes the snapshot with respect to the virtual 3D model and determines uncaptured regions on the surface of the virtual 3D model.

9. The system of claim 8, wherein the uncaptured regions are disregarded during the highlighting of visual differences.

10. The system of claim 4, wherein image regions are extracted from the snapshot and wherein the extracted image regions are projected onto the virtual 3D model and wherein the projected images are used as part of the difference extraction.

11. The system of claim 1, further comprising a voice navigation unit generating voice guidance for navigating the camera to line up with a previous image.

12. The system of claim 2, wherein additional indications are overlaid onto the live feed to indicate at least one of a distance from the object to be captured, a pan and tilt angle of the camera, and an up angle of the camera.

13. The system of claim 1, wherein the second indication is represented by a sphere.

14. A system, comprising:
    a camera receiving live feed;
    a database of pictures;
    a determining unit determining an angle and a position associated with an object to be captured, wherein the determining unit determines a plurality of angles and a position associated with the live feed relative to the object to be captured;
    a guiding unit providing a first indication indicating the angle associated with the object to be captured relative to the live feed, and providing a second indication indicating the position of the object to be captured relative to the live feed, and wherein a third indication is provided if at least one angle in the plurality of angles and the position associated with the live feed is within a specified tolerance to the angle and position of the object to be captured;
    wherein said first and second indications are overlaid onto the live feed, wherein a vector associated with the object to be captured and a width representing the specified tolerance is calculated, wherein the first indication is represented by a cylinder, the radius of the cylinder representing the specified tolerance and an axis of the cylinder represents the calculated vector associated with the camera angle of the object to be captured.

15. A method for navigating a camera receiving live feed to take a snapshot at an angle and position similar to a previous snapshot, the method comprising:

determining the angles and position of the previous snapshot based on a virtual 3D model;

determining a plurality of camera angles and position of the live feed with respect to the virtual 3D model; and simultaneously overlaying indications onto the live feed of the camera based on the angles and the position of the previous snapshot relative to the plurality of camera angles and the position of the live feed, wherein said indications are overlaid onto the live feed and displayed on a display device to indicate the angles and the position of the previous snapshot relative to the plurality of camera angles and the position of the live feed, wherein a first indication is represented by a cone, wherein a vertex of the cone is located at the object and an axis of the cone is extended in a camera-to-object direction, and a vertex angle formed between the vertex and the axis indicates an amount of difference between the live feed and the object that is acceptable.

16. The method of claim 15, further comprising another indication when an angle and position of the live feed is within a specified tolerance of an angle and position of the previous snapshot.

17. A method for navigating a camera receiving live feed to take a snapshot at a camera angle and position similar to a previous snapshot, the method comprising:

receiving an input;

interpolating the camera angle and the position of the previous snapshot based on the input;

determining an angle and position of the live feed; and simultaneously overlaying indications onto the live feed of the camera based on the interpolated angle and position of the previous snapshot relative to the angle and position of the live feed, wherein said indications are overlaid onto the live feed and displayed on a display device to indicate the interpolated angle and position of the previous snapshot relative to the angle and position of the live feed, wherein a first indication is represented by a cone, wherein a vertex of the cone is located at the object and an axis of the cone is extended in a camera-to-object direction, and a vertex angle formed between the vertex and the axis indicates an amount of difference between the live feed and the object that is acceptable.

18. The method of claim 17, further comprising another indication when the angle and position of the live feed is within a specified tolerance of the angle and position of the previous snapshot.

19. A non-transitory computer readable medium provided with instructions being executed by a processor for receiving live feed to take a snapshot at an angle and position similar to a previous snapshot, the instructions comprising:

determining the angles and position of the previous snapshot based on a virtual 3D model;

determining a plurality of camera angles and position of the live feed with respect to the virtual 3D model; and simultaneously overlaying indications onto the live feed of the camera based on the angles and the position of the previous snapshot relative to the plurality of camera angles and the position of the live feed, wherein said indications are overlaid onto the live feed and displayed on a display device to indicate the angles and the position of the previous snapshot relative to the plurality of camera angles and the position of the live feed, wherein a first indication is represented by a cone, wherein a vertex of the cone is located at the object and an axis of the cone is extended in a camera-to-object direction, and a vertex angle formed between the vertex and the axis indicates an amount of difference between the live feed and the object that is acceptable.

20. The non-transitory computer readable medium of claim 19, wherein the instructions further comprise providing an indication when an angle and position of the live feed is within a specified tolerance of an angle and position of the previous snapshot.

21. A non-transitory computer readable medium provided with instructions being executed by a processor for navigating a camera receiving live feed to take a snapshot at a camera angle and position similar to a previous snapshot, the instructions comprising:

receiving an input;

interpolating the camera angle and the position of the previous snapshot based on the input;

determining an angle and position of the live feed; and simultaneously overlaying indications onto the live feed of the camera based on the interpolated angle and position of the previous snapshot relative to the angle and position of the live feed, wherein said indications are overlaid onto the live feed and displayed on a display device to indicate the angles and the position of the previous snapshot relative to the plurality of camera angles and the position of the live feed, wherein a first indication is represented by a cone, wherein a vertex of the cone is located at the object and an axis of the cone is extended in a camera-to-object direction, and a vertex angle formed between the vertex and the axis indicates an amount of difference between the live feed and the object that is acceptable.

22. The non-transitory computer readable medium of claim 21, wherein the instructions further comprise providing an indication when the angle and position of the live feed is within a specified tolerance of the angle and position of the previous snapshot.

* * * * *